United States Patent
Katou et al.

(10) Patent No.: US 8,485,669 B2
(45) Date of Patent: Jul. 16, 2013

(54) PROJECTOR AND ILLUMINATION APPARATUS FOR SAME

(75) Inventors: Atsushi Katou, Tokyo (JP); Motoyasu Utsunomiya, Tokyo (JP); Akihiro Osaka, Tokyo (JP); Hiroyuki Saitou, Tokyo (JP); Masateru Matsubara, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 227 days.

(21) Appl. No.: 12/734,692

(22) PCT Filed: Jan. 29, 2010

(86) PCT No.: PCT/JP2010/051239
§ 371 (c)(1),
(2), (4) Date: May 18, 2010

(87) PCT Pub. No.: WO2011/092843
PCT Pub. Date: Aug. 4, 2011

(65) Prior Publication Data
US 2012/0019788 A1 Jan. 26, 2012

(51) Int. Cl.
*G03B 21/00* (2006.01)

(52) U.S. Cl.
USPC .......... 353/31; 353/37; 353/38; 353/94; 353/98; 353/122; 362/227

(58) Field of Classification Search
USPC ............... 353/31, 20, 30, 33, 34, 37, 99, 102, 353/94, 38, 98, 122; 362/227, 231, 235, 800, 362/280, 293; 359/385, 387, 198.1; 349/5, 349/7, 8, 9

See application file for complete search history.

(56) References Cited

U.S. PATENT DOCUMENTS

| 5,300,942 A * | 4/1994 | Dolgoff ........................ 345/32 |
| 6,644,814 B2 | 11/2003 | Ogawa et al. |
| 6,747,710 B2 * | 6/2004 | Hall et al. ........................ 349/9 |
| 7,300,177 B2 * | 11/2007 | Conner ........................ 362/244 |
| 7,390,097 B2 * | 6/2008 | Magarill ........................ 353/94 |
| 7,878,657 B2 * | 2/2011 | Hajjar ........................ 353/29 |
| 2003/0133080 A1 | 7/2003 | Ogawa et al. |

(Continued)

FOREIGN PATENT DOCUMENTS

| JP | 2000-111941 A | 4/2000 |
| JP | 2003-186110 A | 7/2003 |

(Continued)

OTHER PUBLICATIONS

ISR dated Mar. 2, 2010.

*Primary Examiner* — William C Dowling
*Assistant Examiner* — Sultan Chowdhury
(74) *Attorney, Agent, or Firm* — McGinn IP Law Group, PLLC

(57) ABSTRACT

An illumination apparatus includes a fluorescence unit, laser light irradiation means, and a beam integration unit. The fluorescence unit has a plurality of phosphors, in which the colors of fluorescence generated due to excitation differ, arranged in different regions. The laser light irradiation means irradiates laser light onto the regions of each color of the fluorescence unit while changing the position at which the laser light strikes the fluorescence unit. The beam integration unit integrates fluorescence from each region of the fluorescence unit on a display panel.

8 Claims, 13 Drawing Sheets

U.S. PATENT DOCUMENTS

| | | | |
|---|---|---|---|
| 2006/0098451 A1* | 5/2006 | Hsu et al. | 362/555 |
| 2006/0221021 A1 | 10/2006 | Hajjar et al. | |
| 2006/0221022 A1 | 10/2006 | Hajjar | |
| 2006/0227087 A1 | 10/2006 | Hajjar et al. | |
| 2007/0014318 A1 | 1/2007 | Hajjar et al. | |
| 2007/0019408 A1* | 1/2007 | McGuire et al. | 362/231 |
| 2007/0046176 A1 | 3/2007 | Bukesov et al. | |
| 2007/0187616 A1 | 8/2007 | Burroughs et al. | |
| 2007/0188417 A1 | 8/2007 | Hajjar et al. | |
| 2007/0206258 A1 | 9/2007 | Malyak et al. | |
| 2007/0228927 A1 | 10/2007 | Kindler et al. | |
| 2008/0203901 A1 | 8/2008 | Bukesov et al. | |
| 2009/0153582 A1 | 6/2009 | Hajjar et al. | |
| 2009/0284148 A1 | 11/2009 | Iwanaga | |
| 2010/0149435 A1* | 6/2010 | Kataoka | 348/744 |
| 2010/0157403 A1* | 6/2010 | Lai | 359/198.1 |

FOREIGN PATENT DOCUMENTS

| | | |
|---|---|---|
| JP | 2004-341105 A | 12/2004 |
| JP | 2008-52070 A | 3/2008 |
| JP | 2008-538145 A | 10/2008 |
| JP | 2009-277516 A | 11/2009 |
| WO | WO 2006/107720 | 10/2006 |

* cited by examiner

PROJECTOR AND ILLUMINATION APPARATUS FOR SAME

TECHNICAL FIELD

The present invention relates to a projector for projecting an image on a screen and to an illumination apparatus for the projector.

BACKGROUND ART

Technology using an LED (Light-Emitting Diode) is now receiving attention as the light source of a projector that projects an image on a screen such as a liquid crystal projector or a DMD (Digital Micromirror Device) projector (see Patent Document 1).

Because an LED features long service life and high reliability, a projector that uses an LED as a light source has these advantages of long service life and high reliability. In addition, an LED can be caused to flash on and off at high speed and can thus broaden the range of color reproducibility of an image.

However, as the light source for a projector, the light of an LED typically has low luminance, and obtaining an image with sufficient luminance is therefore problematic in a projector that uses an LED as a light source. The degree to which light from a light source can be used as projection light on a display panel is limited by étendue. Specifically, light from a light source cannot by efficiently employed as a projection light if the value of the product of the emitted light area of the light source and the radiation angle is not suppressed to a value equal to or less than the value of the product of the area of the incident surface of the display panel and the acceptance angle that is determined by the f-number of the illumination optical system.

In a light source realized by an LED, increasing the emitted light area can raise the quantity of light, but increasing the emitted light area also increases the étendue of the light source. Although increasing the quantity of light without increasing the light emission area is desirable as a light source of a projector due to the limits of étendue, increasing the quantity of light without increasing the emission light area is problematic in a light source realized by an LED.

In contrast, methods of obtaining fluorescence with high luminance include a method of irradiating a laser light upon a phosphor to obtain fluorescence by excitation. In this method, fluorescence that has greater luminance than an LED can be obtained efficiently by the appropriate selection of the fluorescent substance.

LITERATURE OF THE PRIOR ART

Patent Document

Patent Document 1: JP-A-2003-186110

SUMMARY OF THE INVENTION

Problem to be Solved by the Invention

However, a laser has the characteristic in which the peak of spatial light intensity is high, and in which parts of a phosphor that are struck by the laser are therefore prone to damage. As a result, in a construction in which fluorescence is generated by excitation by irradiating a laser on a phosphor, damage to the phosphor caused by the laser irradiation raises problems.

Damage to the phosphor degrades the performance of the projector, and long service life is therefore problematic in this type of projector.

It is an object of the present invention to provide a projector having high luminance and long service life and an illumination apparatus for the projector.

Means for Solving the Problem

To achieve the above-described object, the illumination apparatus of the present invention includes:
a fluorescence unit in which a plurality of phosphors, in which the colors of fluorescence generated by excitation are different, are each arranged in a different region;
laser light irradiation means that irradiates laser light onto the regions of each color of the fluorescence unit while changing the position at which the laser light strikes; and
a beam integration unit that integrates, on a display panel, the fluorescence from each region of the phosphors.

The projector of the present invention includes:
a fluorescence unit in which a plurality of phosphors, in which the colors of fluorescence generated by excitation are different, are each arranged in a different region;
laser light irradiation means that irradiates laser light onto regions of each color of the fluorescence unit while changing the position at which the laser light strikes in the fluorescence unit;
a beam integration unit that integrates fluorescence from each region of the phosphors on a display panel; and
an image display unit that displays an image by the fluorescence that was integrated in the beam integration unit.

Effect of the Invention

The present invention uses fluorescence that is excited by a laser light irradiated onto phosphors while changing the irradiation position in the projection of an image and therefore can achieve high luminance and long service life of the projector and the illumination apparatus.

EXEMPLARY EMBODIMENT OF THE INVENTION

Exemplary embodiments of the present invention are next described in detail with reference to the accompanying figures.

First Exemplary Embodiment

Figure 1:
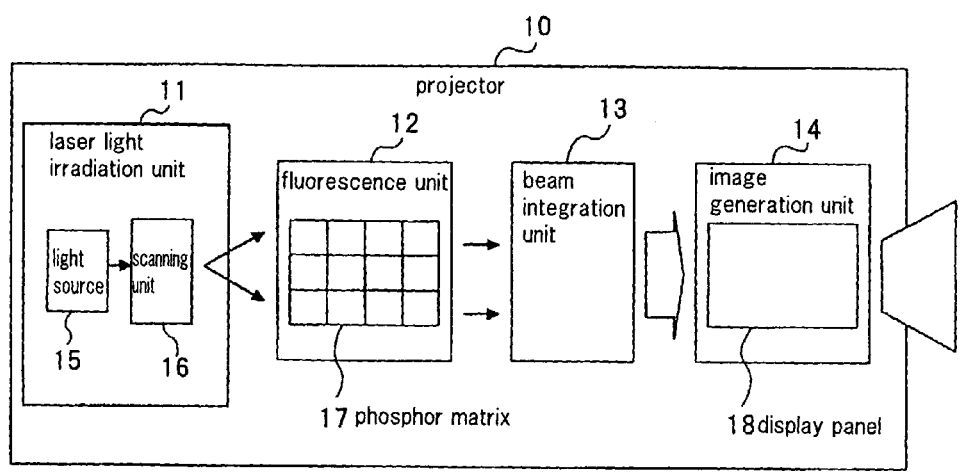
FIG. 1 is a block diagram showing the overall schematic configuration of the projector according to the first exemplary embodiment.

FIG. 1 is a block diagram showing the overall schematic configuration of a projector realized by the first exemplary embodiment. Referring to FIG. 1, projector 10 includes: laser light irradiation unit 11, fluorescence unit 12, beam integration unit 13, and image generation unit 14. Laser light irradiation unit 11 includes light source 15 and scanning unit 16.

Fluorescence unit 12 is provided with phosphor matrix 17 in which cells composed of microlenses to which are applied phosphors that absorb laser light and emit red, green or blue light by excitation are arranged in matrix form. The cells of each color in phosphor matrix 17 are arranged repeatedly in a predetermined order such that the fluorescence of each color realized by a raster scan of laser light that will be described hereinbelow is obtained at the required luminance. Phosphor matrix 17 of the present exemplary embodiment is a transmission phosphor matrix 17 that radiates fluorescent light in the same direction (transmission direction) as the direction of advance of the laser light. The wavelength of the laser light that is irradiated into fluorescence unit 12 may be a shorter wavelength than the wavelength of fluorescence emitted from the fluorescence unit.

Laser light irradiation unit 11 performs a raster scan such that the position at which the laser light scanning beam strikes successively passes through each microlens of phosphor matrix 17 provided in fluorescence unit 12. In this way, red, green, and blue fluorescent light is radiated periodically in time divisions from fluorescence unit 12. The fluorescence radiated from fluorescence unit 12 is incident to beam integration unit 13.

Beam integration unit 13 shapes the fluorescence from fluorescence unit 12 into a rectangle of appropriate size, and further, equalizes the luminance distribution and irradiates the fluorescence into image generation unit 14. This beam integration unit 13 may also be called an integrator.

In addition, laser light irradiation unit 11, fluorescence unit 12, and beam integration unit 13 may together be referred to as an illumination apparatus.

Image generation unit 14 is provided with display panel 18 that changes the state of each pixel according to the image of each color that is to be displayed in synchronization with the incidence of the fluorescence of each color. Image generation unit 14 generates an image by transmitting the fluorescence that was shaped in beam integration unit 13 to display panel 18 or by reflecting the fluorescence by display panel 18, and projects the image onto a screen (not shown). As one example, display panel 18 is here assumed to be a transmission liquid crystal panel. Image generation unit 14 changes the state of each pixel of the liquid crystal panel at high speed and in synchronization with the incidence of fluorescence.

Figure 2:
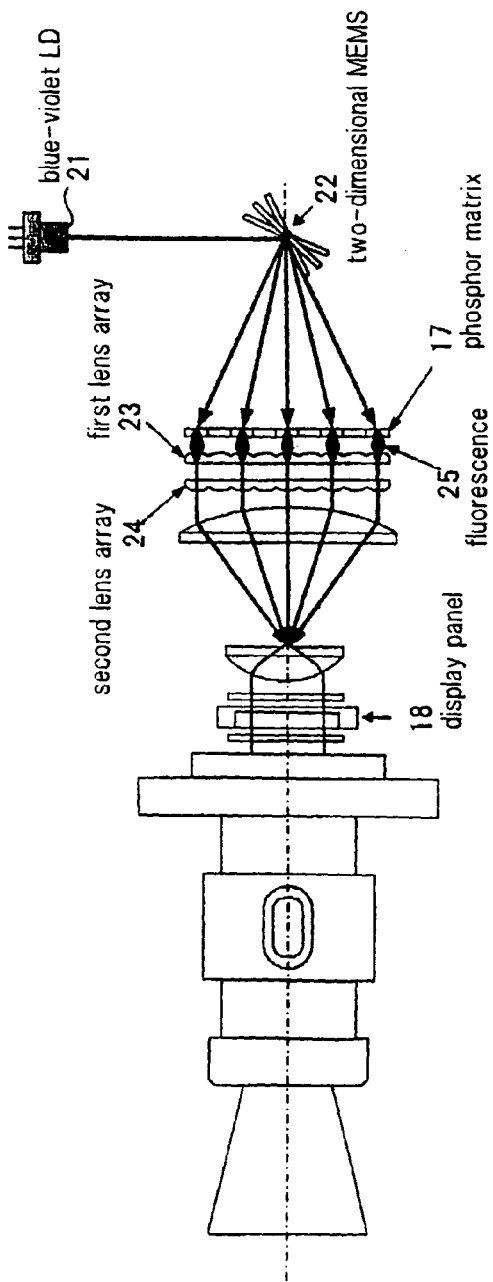
FIG. 2 is a schematic view for explaining in detail laser light irradiation unit 11, fluorescence unit 12, and beam integration unit 13 of the projector according to the first exemplary embodiment.

FIG. 2 is a schematic view for describing the details of laser light irradiation unit 11, fluorescence unit 12, and beam integration unit 13 of the projector according to the first exemplary embodiment. Blue-violet laser diode 21 and two-dimensional MEMS 22 in FIG. 2 correspond to light source 15 and scanning unit 16, respectively, in FIG. 1. First lens array 23, second lens array 24, and lens groups that succeed these components correspond to beam integration unit 13.

Blue-violet laser diode (LD) 21 delivers a laser beam. As an example, the wavelength of this laser beam is here assumed to be 405 nm. The wavelength of the laser light that is irradiated upon fluorescence unit 12 may be a shorter wavelength than the wavelength of the fluorescence that is emitted from the fluorescence unit, and as an example, may be a blue color with a wavelength of 450 nm. The beam from blue-violet laser diode 21 is incident to two-dimensional MEMS 22. The duty ratio of pulse oscillation of blue-violet laser diode 21 may be controlled such that a fluorescence of a desired luminance is obtained from phosphor matrix 17 of fluorescence unit 12.

Two-dimensional MEMS 22 is a MEMS (Micro Electro Mechanical Systems) mirror that performs two-dimensional scanning by driving a mirror by, for example, electrostatic force to change the direction of reflected light, and two-dimensional MEMS 22 performs a raster-scan of the microlenses of phosphor matrix 17 by means of a scanning beam realized by reflecting the beam from blue-violet laser diode 21.

Figure 3:
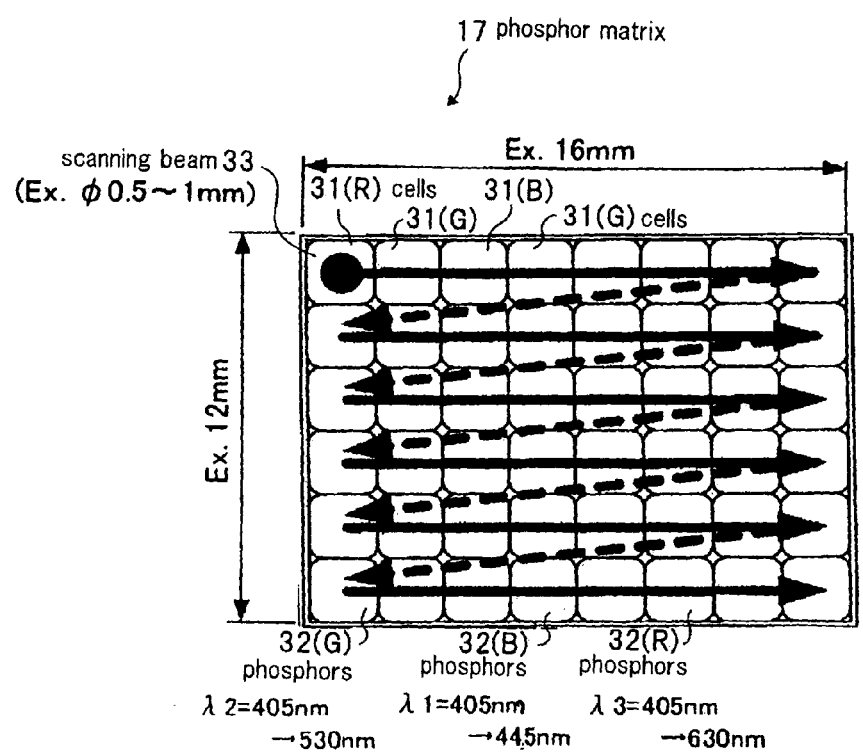
FIG. 3 shows the state of cell arrangement and raster scan of phosphor matrix 17.

FIG. 3 shows the state of the cell arrangement and raster scan of phosphor matrix 17. In the example of FIG. 3, 8×6 cells 31 are arranged in phosphor matrix 17 having a length of 16 mm in the horizontal direction and a length of 12 mm in the vertical direction. Red (R), green (G), or blue (B) phosphor 32 is applied to each cell 31. Due to the incidence of a blue-violet laser having a wavelength of 405 nm, red phosphor 32 (R) radiates red fluorescent light with a wavelength of 630 nm. Due to the incidence of blue-violet laser having a wavelength of 405 nm, green phosphor 32 (G) radiates a green fluorescent light having a wavelength of 530 nm. Due to the incidence of blue-violet laser having a wavelength of 405 nm, blue phosphor 32 (B) radiates a blue fluorescent light having a wavelength of 445 nm.

Cells 31 of each color are aligned such that scanning beam 33 in a raster scan passes in the order: red (R), green (G), blue (B) and green (G). As one example, scanning beam 33 is in the order of 0.5-1.0 ϕmm. The arrows in the figure show the state of the raster scan of phosphor matrix 17 by scanning beam 33.

First lens array 23 is a fly-eye lens in which a plurality of lens elements that correspond to each of cells 31 of phosphor matrix 17 are arranged in a matrix form, first lens array 23 being arranged contiguous to phosphor matrix 17 such that each lens element directly confronts a corresponding cell 31 of phosphor matrix 17.

Second lens array 24 is a fly-eye lens in which a plurality of lens elements that correspond to each lens element of first lens array 23 are arranged in matrix form, second lens array 24 being arranged in a position at a predetermined distance from first lens array 23.

To state in detail, first lens array 23 and second lens array 24 are set such that the pupil that is produced in each lens element of the first lens array 23 by means of phosphor 32 of each cell 31 of phosphor matrix 17 forms an image on display panel 18 by means of second lens array 24 and succeeding lens groups.

By means of this configuration, the fluorescence that is irradiated from each cell of phosphor matrix 17 is condensed by each lens element of first lens array 23 and then irradiated into each lens element of second lens array 24. The fluorescence that is incident to each lens element of second lens array 24 is integrated by second lens array and the lens group in a succeeding stage and then irradiated into display panel 18.

Each lens element of first lens array 23 preferably condenses light such that the fluorescence from a corresponding cell of phosphor matrix 17 efficiently and as uniformly as possible illuminates the pupil and, as much as possible, efficiently irradiates the condensed light into only the corresponding lens element of second lens array 24. Each lens element of first lens array 23 for realizing these objects has a spherical surface on the side of phosphor matrix 17 and a non-spherical surface on the side of second lens array 24. Because this is a known construction, detailed explanation is here omitted.

According to the present exemplary embodiment as described hereinabove, laser light irradiation unit 11 implements raster scanning such that the position of phosphor matrix 17 that is struck by laser light changes, whereby fluorescence can be obtained with high luminance while mitigating damage to phosphors 32 and longer service life is achieved for the illumination apparatus and projector 10 that uses the illumination apparatus.

According to the present exemplary embodiment, controlling the duty ratio of the pulse oscillation of blue-violet laser diode 21 such that fluorescence of a desired luminance is obtained allows the greatest possible limitation of damage to phosphors 32 within the range in which fluorescence of suitable luminance is obtained.

According to the present exemplary embodiment, moreover, first lens array 23 that is adjacent to phosphor matrix 17, second lens array 24, and lens groups of succeeding stages are used to integrate fluorescence from each cell 31 of phosphor matrix 17, whereby fluorescence unit 12 and beam integration unit 13 can be miniaturized.

In addition, high-speed raster scanning by means of two-dimensional MEMS 22 enables switching the color of the fluorescence at high speed, whereby the color breaking such as produced in a projector that uses a color wheel is reduced.

In addition, high-speed raster scanning by means of two-dimensional MEMS 22 enables high-speed modulation, whereby the degree of freedom in fluorescence control is enhanced and higher luminance is facilitated.

Figure 4:
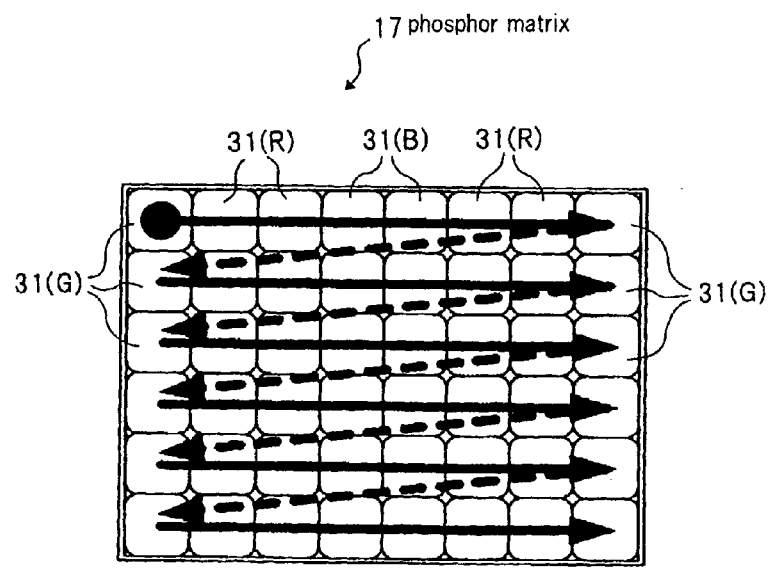
FIG. 4 shows phosphor matrix 17 of another configuration.

In the present exemplary embodiment, an example is shown in which cells 31 are arranged such that the colors of phosphors 32 are repeated as: red (R), green (G), blue (B), and green (G) in phosphor matrix 17 as shown in FIG. 3. However, the present invention is not limited to this form, and the arrangement of cells 31 may be determined according to the scanning speed of the raster scan and the required luminance. For example, cells 31 may be arranged such that the colors of phosphors 32 are repeated as green (G), red (R), red (R), blue (B), blue (B), red (R), red (R), green (G), as shown in FIG. 4.

Further, although an example was shown in the present exemplary embodiment in which first lens array 23 was arranged adjacent to phosphor matrix 17 as shown in FIG. 2, the present invention is not limited to this form. As another example, phosphor matrix 17 may be configured as a single unit with first lens array 23 by directly transferring phosphors 32 of each color on the incident surface side of each lens element of first lens array 23. In this way, fluorescence unit 12 and beam integration unit 13 can be further miniaturized.

Figure 5:
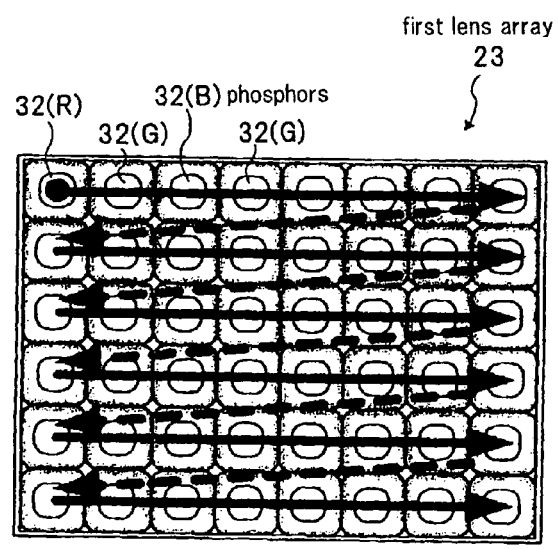
FIG. 5 shows first lens array 23 that is unified with phosphor matrix 17.

Further, as shown in FIG. 5, phosphors 32 of each color may be arranged in only the center portion of each lens element of first lens array 23. In this way, first lens array 23 can absorb all of the light emitted from phosphors 32. By controlling the light emission timing of blue-violet laser diode 21 at this time such that laser light is discretely irradiated only on locations in which phosphors exist, unnecessary light emission is eliminated and power consumption can be limited. Points at which phosphor 32 is not arranged in each lens element of first lens array 23 may be covered by a shield plate of a material that does not transmit light.

Second Exemplary Embodiment

The overall schematic configuration of the projector according to the second exemplary embodiment is identical to that of the first exemplary embodiment shown in FIG. 1. The second exemplary embodiment differs from the first exemplary embodiment in that scanning of the laser light beam is realized by an optical modulation element and the fluorescence of each color is integrated by a light tunnel.

Figure 6:
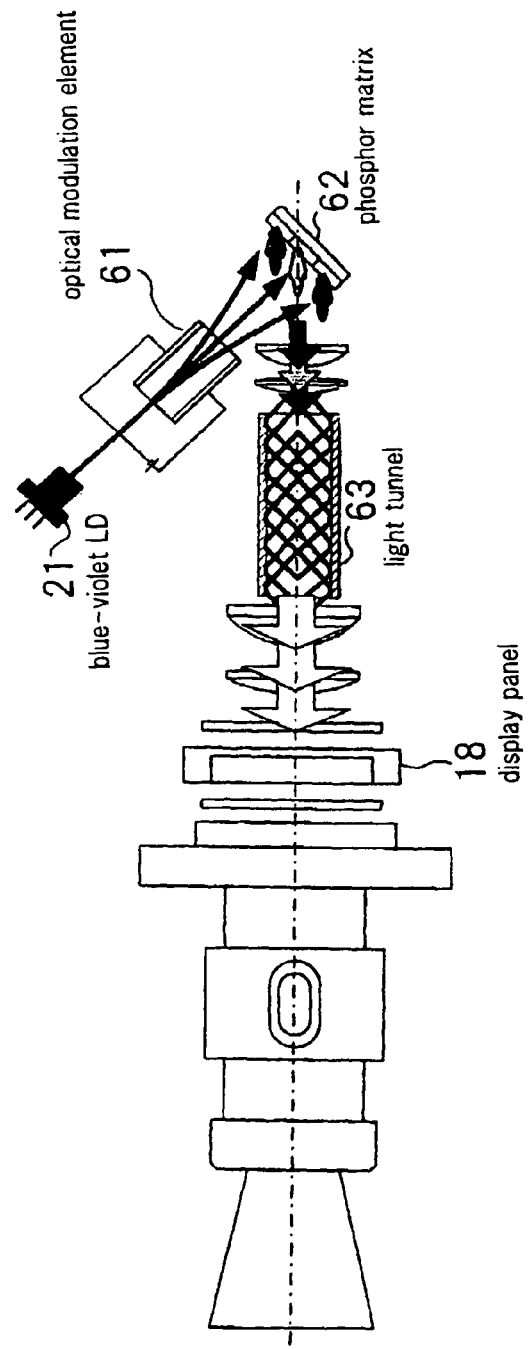
FIG. 6 is a schematic view for explaining in detail laser light irradiation unit 11, fluorescence unit 12, and beam integration unit 13 of the projector according to the second exemplary embodiment.

FIG. 6 is a schematic view for describing the details of laser light irradiation unit 11, fluorescence unit 12, and beam integration unit 13 of the projector according to the second exemplary embodiment. Blue-violet laser diode 21 and optical modulation element 61 in FIG. 6 each correspond to light source 15 and scanning unit 16, respectively, in FIG. 1. Light tunnel 63 and the preceding and succeeding lens groups correspond to beam integration unit 13.

Blue-violet laser diode 21 and display panel 18 are identical to the first exemplary embodiment shown in FIG. 1.

Optical modulation element 61 changes the direction of advance of laser light from blue-violet laser diode 21 to perform raster scanning of phosphor matrix 62 with laser light. As a concrete example, optical modulation element 61 is an acousto-optic element that performs analog modulation of the index of refraction when voltage is applied and changes the direction of advance of the laser light.

In contrast with phosphor matrix 17 according to the first exemplary embodiment, phosphor matrix 62 is a reflection phosphor matrix. Phosphor matrix 62 is of a configuration in which cells that are coated with phosphors that absorb laser light and that emit red, green, or blue light due to excitation and that reflect fluorescent light are arranged in matrix form. The cells of each color in phosphor matrix 62 are arranged so that each color is repeated in a predetermined order such that fluorescence of each color is obtained in the required luminance by raster scanning by laser light that will be described hereinbelow. The fluorescence from each cell of phosphor matrix 62 is incident to light tunnel 63 by way of lens groups.

Light tunnel 63 is an optical element having a polygonal column shape that uniformly shapes fluorescence from phosphor matrix 62 by repeated reflection on its inner surfaces. In this case, the light tunnel includes forms in which the inside surfaces of the hollow interior are made up of mirrors and forms composed of a solid transparent polygonal column and that employ total reflection. The latter form is also referred to as a rod lens.

By means of the configuration shown in FIG. 6, the fluorescence of each color from each cell of phosphor matrix 62 undergoes equalization of luminance distribution in light tunnel 63 and is irradiated to display panel 18 by a time series for each color.

According to the present exemplary embodiment as explained hereinabove, laser light irradiation unit 11 implements raster scanning such that the position at which the laser light of phosphor matrix 62 strikes changes, whereby fluorescence of high luminance can be obtained while mitigating damage to phosphors 32, and a longer service life can be achieved for an illumination apparatus and projector 10 that uses the illumination apparatus.

According to the present exemplary embodiment, scanning unit 16 is made up of a compact optical modulation element that performs direct analog modulation of laser light, and the illumination apparatus and projector can therefore be miniaturized by the miniaturization of scanning unit 16.

Still further, color breaking can be reduced because scanning unit 16 is made up of an optical modulation element capable of high-speed modulation according to the present exemplary embodiment. In addition, higher luminance is facilitated due to the greater degree of freedom of the control of fluorescence.

Figure 7:
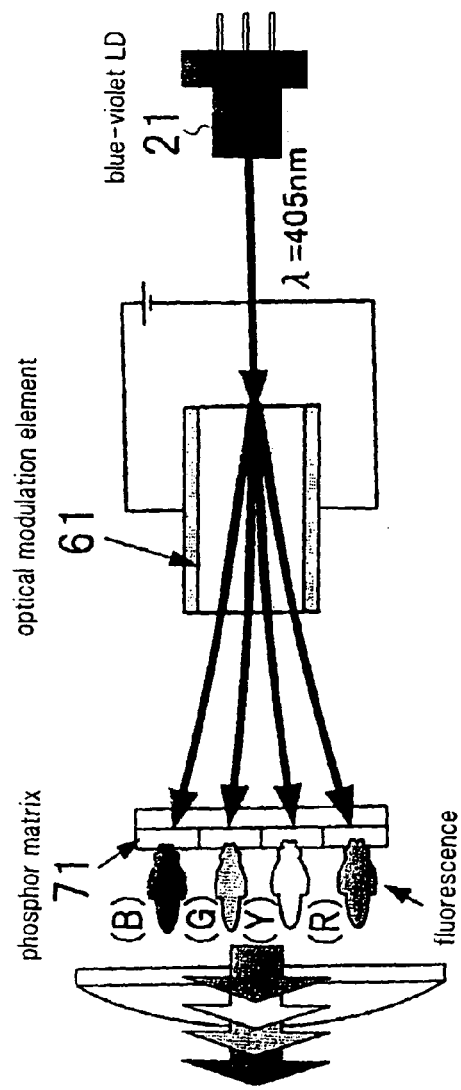
FIG. 7 is a schematic view for describing a modification that uses a transmission phosphor matrix in which cells of phosphors of four colors are arranged.

Although an example was shown in the present exemplary embodiment in which cells of phosphors of the three colors red (R), green (G), and blue (B) are arranged in phosphor matrix 62, the phosphors arranged in the phosphor matrix are not limited to three colors and any number of colors may be used. Further, although reflection phosphor matrix 62 was used in the present exemplary embodiment, transmission phosphor matrix 17 can also be used as in the first exemplary embodiment. As a phosphor matrix that can be applied in the present exemplary embodiment, FIG. 7 shows an example of a configuration that uses transmission phosphor matrix 71 in which cells of phosphors of the four colors red (R), yellow (Y), green (G), and blue (B) are arranged. Phosphor matrix 71 in which phosphors of multiple colors are arranged is subjected to direct and high-speed analog modulation in compact optical modulation element 61, whereby an image of rich color can be displayed by an apparatus of compact configuration.

Although an example was shown of a configuration in which the fluorescence of phosphor matrix 62 in which cells of each color are arranged is irradiated into a light tunnel by way of lens groups in the present exemplary embodiment, the present invention is not limited to this form.

As another example, a section (fluorescence section) that is divided into regions for each color and to which phosphors are applied may be arranged adjacent to the end surface of a rod lens with an air layer interposed and fluorescence from the fluorescence section directly irradiated into the rod lens. In this way, the need for a lens group between the section to which phosphors are applied and the rod lens is eliminated. Further, the end surface of the rod lens may also be divided into regions and phosphors of each color that is applied, whereby fluorescence unit 12 and beam integration unit 13 can be unified to achieve greater miniaturization.

Figure 8:
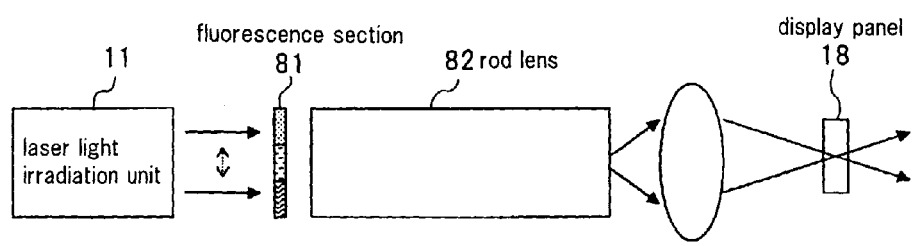
FIG. 8 is a schematic view for explaining a modification in which a fluorescence section is arranged adjacent to the end surface of a light tunnel.
Figure 9:
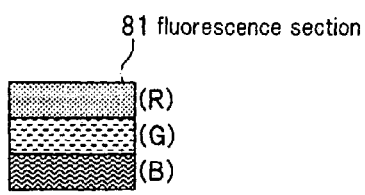
FIG. 9 shows the divided application of colors in fluorescence section 81.

FIG. 8 is a schematic view for explaining a modification in which a fluorescence section is arranged adjacent to the end surface of a rod lens. Fluorescence section 81 in FIG. 8 corresponds to fluorescence unit 12 in FIG. 1. FIG. 9 shows the divided application of colors in fluorescence section 81. Fluorescence section 81 is divided by the application of phosphors of red (R), green (G), and blue (B) into regions of three parts: top, middle and bottom.

Laser light irradiation unit 11 carries out scanning such that a scanning laser successively passes over the region of each color of fluorescence section 81. The fluorescence irradiated from the phosphors of each color by excitation resulting from the scanning laser is shaped by rod lens 82 and passes by way of a lens group to form an image on display panel 18.

Although an example was shown in the present exemplary embodiment in which scanning is carried out such that laser light from one blue-violet laser diode 21 passes through cells of each color of phosphor matrix 62, the present invention is not limited to this form. As another example, laser light irradiation unit 11 may include, as light source 15, three blue-violet laser diodes 21 that successively light up in time divisions and may place each of the three blue-violet laser diodes 21 in association with a respective color. By means of this configuration, the wavelength of laser light that excites the phosphor of each color can be set to a suitable value for each color, whereby the fluorescence of each color can be more efficiently generated. In addition, the lighting time of each blue-violet laser diode 21 can be shortened with respect to the time that the projector is used to achieve a longer service life of blue-violet laser diodes 21.

Figure 10:
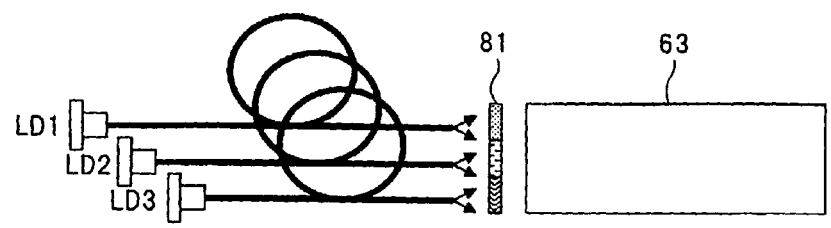
FIG. 10 is a view for describing a modification in which three blue-violet laser diodes are lit in time divisions.
Figure 11:
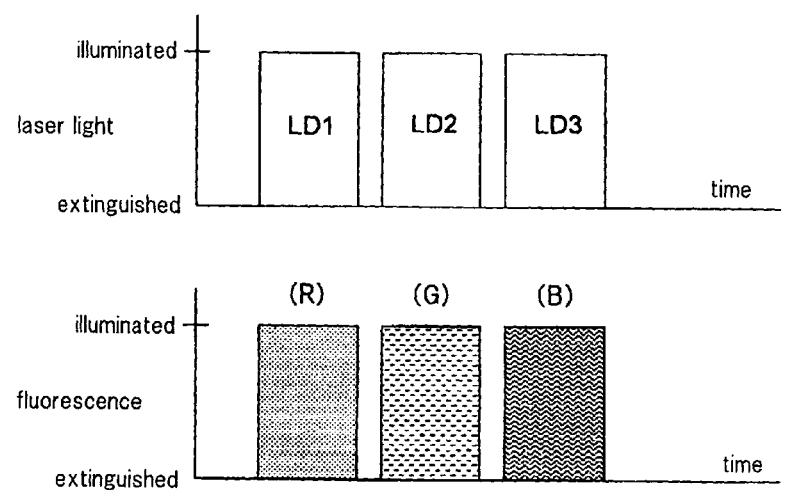
FIG. 11 is a timing chart showing the lighting in time divisions of each blue-violet laser diode and the change of the fluorescence incident to display panel 18.

FIG. 10 is an explanatory view of a modification in which three blue-violet laser diodes are lit up in time divisions. Fluorescence section 81 of this modification is identical to that shown in FIG. 9. FIG. 11 is a timing chart showing the lighting in time divisions of each blue-violet laser diode and the changes of the fluorescence irradiated into display panel 18.

Referring to FIG. 10, there are three blue-violet laser diodes LD1-3 in the present modification, and the laser light generated by blue-violet laser diodes LD1-3 is guided by optical fibers 101-103, respectively. Blue-violet laser diodes LD1-3 are lighted in time divisions as shown in FIG. 11.

Because laser light is irradiated in time divisions in the phosphors of each color of fluorescence section 81 due to the lighting realized in time divisions of blue-violet laser diodes LD1-LD3, the color of fluorescence incident to light tunnel 63 from fluorescence section 81 also changes to red (R), green (G), and blue (B) in time divisions.

In the modification shown in FIG. 10, scanning unit 16 may further scan each laser light in the region of each color. As an example of this form, actuators (not shown) that move the transmission parts are provided in the transmission parts of optical fibers 101-103, which are guide members. The movement of the transmission parts by the actuators causes the position in fluorescence section 81 at which each laser light strikes to move through the regions of the colors corresponding to each laser light.

Although a form was adopted in the present modification in which three blue-violet laser diodes LD1-3 are lighted in time divisions, the present invention is not limited to this form. As another example, three blue-violet laser diodes LD1-3 may be lighted simultaneously. In this case, the positions at which the laser light of blue-violet laser diodes LD1-3 strikes may move over the regions of all phosphors of fluorescence section 81, and moreover, scanning may be implemented whereby all laser lights strike the region of the same phosphor simultaneously. However, scanning is preferably implemented whereby the laser light of blue-violet laser diodes LD1-LD3 does not redundantly strike the same position.

In addition, as a modification of scanning unit 16 of the present exemplary embodiment, a configuration may be adopted in which scanning of laser light is implemented by a rotating prism.

Figure 12:
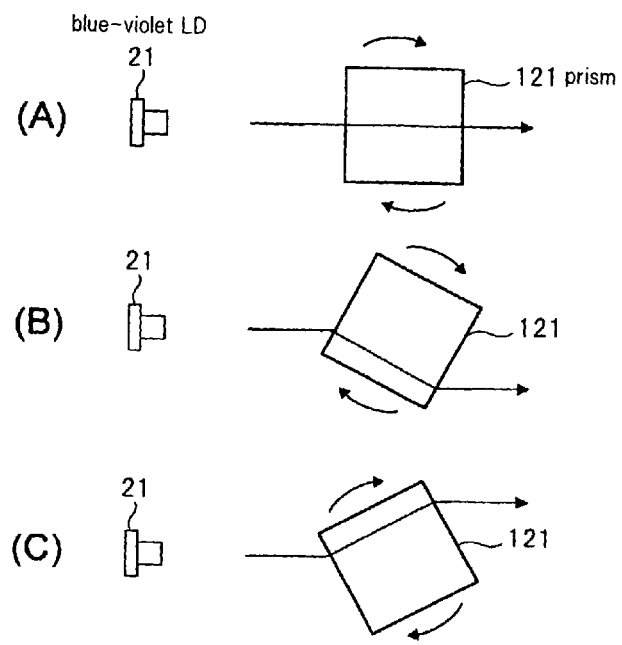
FIG. 12 is a schematic view for describing a modification in which scanning of laser light is carried out by a rotating prism.

FIG. 12 is a schematic view for explaining a modification in which the scanning of laser light is implemented by a rotating prism. In this example, a rectangular parallelepiped prism 121, for which the shape of a section parallel to the plane of the figure is a square, rotates around an axis that passes through prism 121 and that is perpendicular to the plane of the figure.

Figure 13:
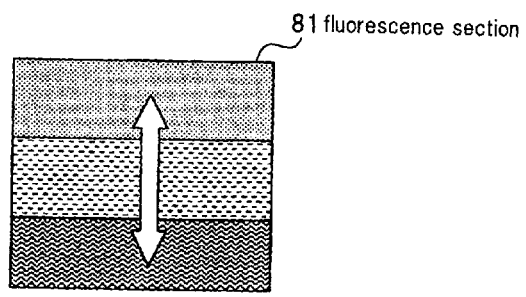
FIG. 13 shows the state of scanning by means of the modification shown in FIG. 12.

Laser light from blue-violet laser diode 21 is incident to prism 121. The rotation of prism 121 from state (A) to state (B) and then to state (C) changes the state of refraction of the laser light. The changes in the refraction of the laser light changes the position at which the laser light strikes in fluorescence unit 12. The scanning of laser light implemented by the rotating prism of FIG. 12 results in linear scanning such as shown by the arrow in FIG. 13. As an example of fluorescence unit 12, fluorescence section 81 is employed in which red (R), green (G), and blue (B) are applied to the upper, middle and lower stages, respectively, as shown in FIG. 9.

Although an example was shown in the present modification in which a rotating prism having a square section was used, the shape is not limited to this form. A rotating prism having another sectional shape may be used in place of the rotating prism shown in FIG. 12, or a polygonal prism may be used.

Figure 14:
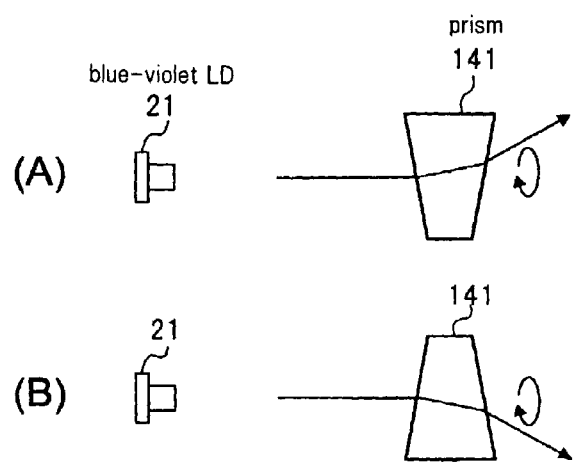
FIG. 14 is a schematic view for describing another modification in which scanning of a laser light is carried out by a rotating prism.

FIG. 14 is a schematic view for explaining another modification in which scanning of laser light is implemented by a rotating prism. In this example, prism 141, which is shaped as a frustum of a regular pyramid in which the shape of a section that is parallel to the plane of the figure is a trapezoid, rotates around a line parallel to the plane of the figure that passes through prism 141 and blue-violet laser diode 21.

Figure 15:
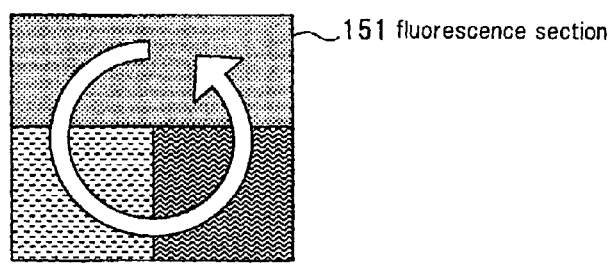
FIG. 15 is a view showing the state of scanning realized by the modification shown in FIG. 14.

Laser light from blue-violet laser diode 21 is irradiated into prism 141. The state of refraction of laser light successively changes as prism 141 rotates from state (A) to state (B) and then back to state (A). The scanning of laser light realized by the rotating prism of FIG. 14 is scanning that describes an arc as shown by the arrow in FIG. 15. In the present modification, the irradiated surface of fluorescence section 151 is divided into an upper section, a lower left side, and a lower right side and each of these regions is subjected to the divided application of phosphors of red (R), green (G), and blue (B) such that the scanning that describes an arc successively passes through the regions of each color.

As a modification of scanning unit 16 of the present exemplary embodiment, a configuration may be adopted in which scanning of the laser light is realized by actuators.

Figure 16:
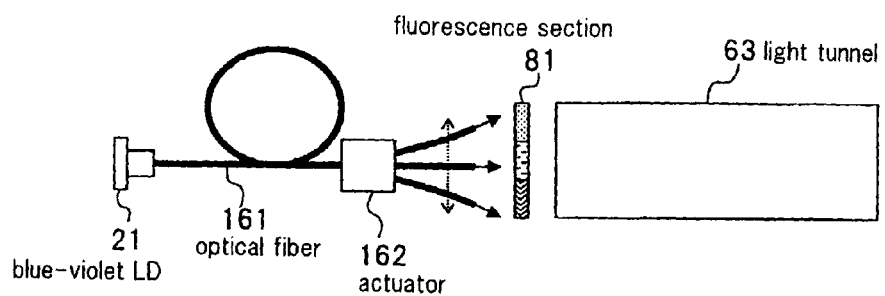
FIG. 16 is a schematic view for describing a modification in which scanning of a laser light is realized by an actuator.

FIG. 16 is a schematic view for describing a modification that implements scanning of laser light by actuators. In the example of FIG. 16, laser light emitted from blue-violet laser diode 21, which is light source 15, is guided by optical fiber 161. Actuator 162 is provided adjacent to the transmission part of optical fiber 161. Optical fiber 161 and actuator 162 correspond to scanning unit 16.

Actuator 162 causes continuous small movement of the transmission part of optical fiber 161. This movement changes the position at which the laser light from the transmission part of optical fiber 161 strikes in fluorescence section 81, and scanning is realized such that the laser light successively passes through the regions of each color of fluorescence section 81. The movement of the transmission part of optical fiber 161 may be a back-and-forth movement on a straight line, or may be movement that describes a circle.

Alternatively, a configuration may be adopted in which scanning of the laser light is realized by using a rotating color wheel as a modification of scanning unit 16 of the present exemplary embodiment.

Figure 17:
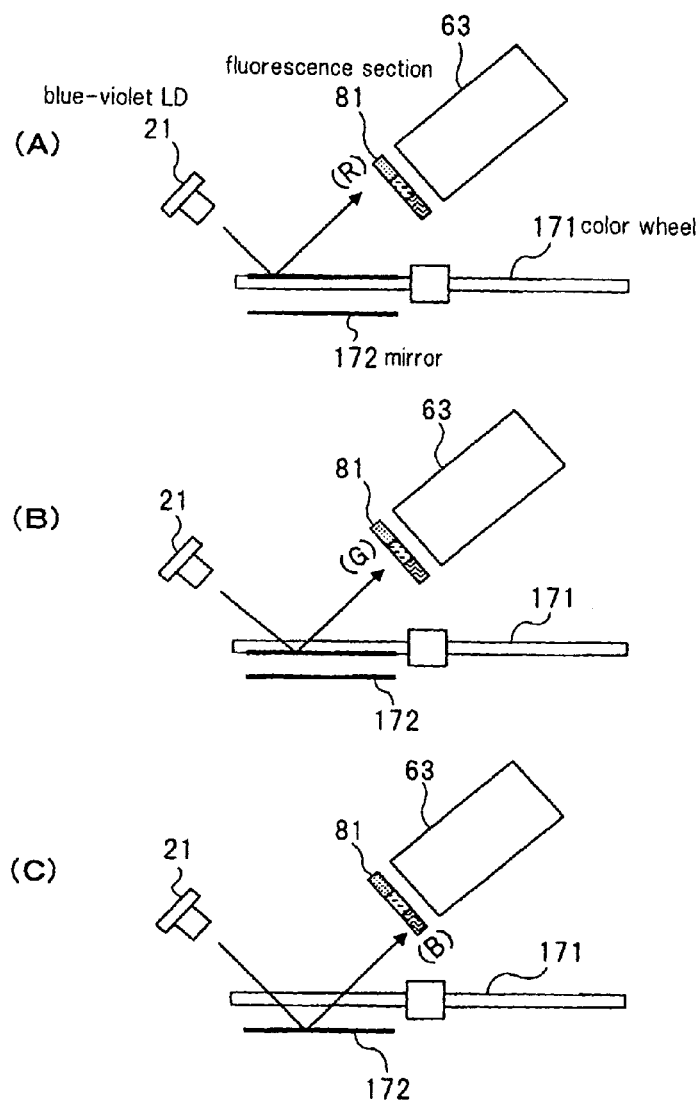
FIG. 17 is a schematic view for explaining a modification in which scanning of a laser light is realized by rotation of a color wheel.
Figure 18:
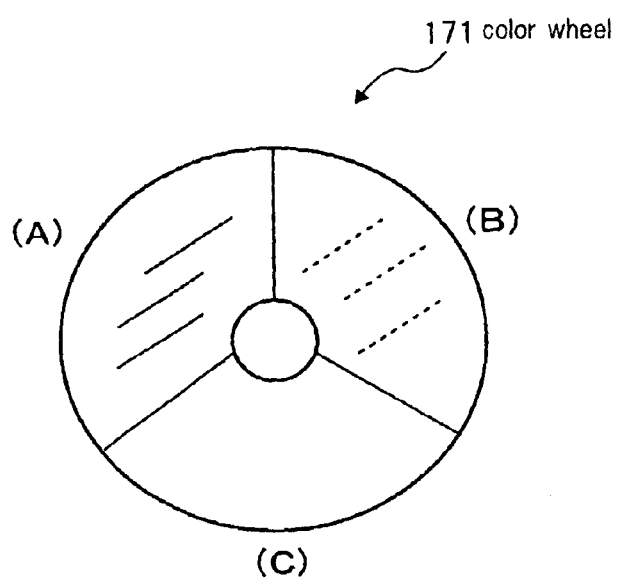
FIG. 18 is a schematic view for describing the shape of the color wheel.

FIG. 17 is a schematic view for describing a modification in which scanning of laser light is realized by the rotation of a color wheel. FIG. 18 is a schematic view for describing the shape of the color wheel.

Color wheel 171 includes upper-surface reflection region (A), lower-surface reflection region (B), and transparent region (C), as shown in FIG. 18. The upper-surface reflection region is an area in which laser light from above is reflected by the upper surface. The lower-surface reflection region is an area in which laser light from above is reflected by the lower surface. The transparent region is an area that transmits the laser light.

As shown in FIG. 17, in the present modification, blue-violet laser diode 21 is arranged such that laser light is irradiated from a direction that is above and oblique to color wheel 171, and mirror 172 is arranged below color wheel 171 and parallel to color wheel 171. Color wheel 171 and mirror 172 correspond to scanning unit 16. When laser light is irradiated from blue-violet laser diode 21, while color wheel 171 rotates, the state of reflection of the laser light changes as shown in FIG. 17(A)-(C).

The relative positions of blue-violet laser diode 21, fluorescence section 81, color wheel 171, and mirror 172 are determined such that: red (R) phosphor is present in the reflection direction that takes the upper-surface reflection region of color wheel 171 as the reflection surface of the laser light from blue-violet laser diode 21; green (G) phosphor is present in the reflection direction that takes the lower-surface reflection region of color wheel 171 as the reflection surface; and blue (B) phosphor is present in the reflection direction that takes mirror 172 as the reflection surface.

Due to the rotation of color wheel 171, in state (A), the laser light from blue-violet laser diode 21 is reflected by the upper-surface reflection region and the laser light is irradiated into the red (R) region of the fluorescence section. In state (B), the laser light from blue-violet laser diode 21 is reflected by the lower-surface reflection region of color wheel 171 and the laser light is irradiated into the region of green (G) of the fluorescence section. In state C, the laser light from blue-violet laser diode 21 passes through color wheel 171 to be reflected by mirror 172 and the laser light is irradiated into the blue (B) region of the fluorescence section.

According to this modification, a projector having high luminance and long service life can be configured by applying the widely employed color wheel technology.

EXPLANATION OF REFERENCE NUMBERS

10 projector
11 laser light irradiation unit
12 fluorescence unit
13 beam integration unit
14 image generation unit
15 light source
16 scanning unit
17, 62, 71 phosphor matrix
18 display panel
21 blue-violet laser diode
22 two-dimensional MEMS
23 first lens array
24 second lens array
25 fluorescence
31 cell
32 phosphor
33 scanning beam
61 optical modulation element
63, 151 light tunnel 81 fluorescence section
82 rod lens
101, 161 optical fiber
121, 141 prism
162 actuator
171 color wheel
172 mirror

The invention claimed is:

1. A display apparatus, comprising:
a laser light irradiation unit comprising a laser light source and a scanning unit that scans light emitted from said laser light source;
a fluorescence unit in which a plurality of cells are arranged, said cells including phosphors that absorb light from said laser light irradiation unit and emit fluorescence;
a beam integration unit that shapes light from said fluorescence unit into a rectangle; and
an image generation unit that displays an image using the light shaped by said beam integration unit.

2. The display apparatus according to claim 1, wherein said scanning unit comprises a mirror that performs a two-dimensional scanning.

3. The display apparatus according to claim 1, wherein a wavelength of the fluorescence emitted from said phosphors is longer than a wavelength of the light emitted from said laser light source, and the plurality of cells are arranged in matrix form.

4. The display apparatus according to claim 1, wherein said beam integration unit comprises a first lense array and a second lense array.

5. The display apparatus according to claim 4, wherein the plurality of cells are arranged in a matrix form, and said first lens array comprises a fly-eye lens array in which a plurality of lens elements are arranged in a matrix form with each lens element facing a corresponding cell.

6. The display apparatus according to claim 5, wherein said second lens array comprises a fly-eye lens array in which a plurality of lens elements corresponding to the lens elements of said first lense array are arranged in a matrix form, and said first lens array and said second lens array are arranged on estrange.

7. The display apparatus according to claim 1, wherein said laser light source comprises a laser diode which emits laser light having a wavelength of 405 nm.

8. A method of displaying an image, said method comprising:
scanning light emitted from a laser light source of a laser light irradiation unit;
absorbing light from said laser light irradiation unit and emitting fluorescence by phosphors of cells arranged in a fluorescence unit;
shaping light from said fluorescence unit into a rectangle; and
displaying said image using the shaped light.

* * * * *